(12) United States Patent
Ye et al.

(10) Patent No.: US 11,776,155 B2
(45) Date of Patent: Oct. 3, 2023

(54) METHOD AND APPARATUS FOR DETECTING TARGET OBJECT IN IMAGE

(71) Applicant: Beijing Baidu Netcom Science and Technology Co., Ltd., Beijing (CN)

(72) Inventors: Xiaoqing Ye, Beijing (CN); Xiao Tan, Beijing (CN); Wei Zhang, Beijing (CN); Hao Sun, Beijing (CN); Errui Ding, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 524 days.

(21) Appl. No.: 16/894,123

(22) Filed: Jun. 5, 2020

(65) Prior Publication Data

US 2021/0174537 A1    Jun. 10, 2021

(30) Foreign Application Priority Data

Dec. 10, 2019    (CN) .......................... 201911259327.X

(51) Int. Cl.
*G06T 7/73*    (2017.01)
*G06N 3/04*    (2023.01)
(Continued)

(52) U.S. Cl.
CPC .............. *G06T 7/73* (2017.01); *G06F 18/214* (2023.01); *G06F 18/24* (2023.01); *G06N 3/04* (2013.01);
(Continued)

(58) Field of Classification Search
CPC . G06T 7/70; G06T 11/20; G06T 2207/20081; G06T 2207/20084; G06T 2210/12; G06T 2207/30236; G06T 7/73; G06K 9/6256; G06K 9/6267; G06N 3/04; G06N 3/08; G06N 3/0454; G06N 3/084;
(Continued)

(56) References Cited

U.S. PATENT DOCUMENTS

2012/0314030 A1* 12/2012 Datta .................. G06T 7/20
348/44
2019/0147245 A1* 5/2019 Qi ...................... G06V 10/82
382/103

(Continued)

*Primary Examiner* — John W Lee
(74) *Attorney, Agent, or Firm* — Kilpatrick Townsend & Stockton LLP

(57) ABSTRACT

Embodiments of the present disclosure provide a method and apparatus for detecting a target object in an image. The method includes: performing following prediction operations using a pre-trained neural network: detecting a target object in a two-dimensional image to determine a two-dimensional bounding box of the target object; and determining a relative position constraint relationship between the two-dimensional bounding box of the target object and a three-dimensional projection bounding box obtained by projecting a three-dimensional bounding box of the target object into the two-dimensional image; and the method further including: determining the three-dimensional projection bounding box of the target object, based on the two-dimensional bounding box of the target object and the relative position constraint relationship between the two-dimensional bounding box of the target object and the three-dimensional projection bounding box.

17 Claims, 6 Drawing Sheets

(51) Int. Cl.
*G06N 3/08* (2023.01)
*G06T 7/70* (2017.01)
*G06T 11/20* (2006.01)
*G06V 10/764* (2022.01)
*G06V 10/82* (2022.01)
*G06V 20/58* (2022.01)
*G06V 20/64* (2022.01)
*G06V 10/25* (2022.01)
*G06F 18/24* (2023.01)
*G06F 18/214* (2023.01)

(52) U.S. Cl.
CPC ............... *G06N 3/08* (2013.01); *G06T 7/70* (2017.01); *G06T 11/20* (2013.01); *G06V 10/764* (2022.01); *G06V 10/82* (2022.01); *G06V 20/58* (2022.01); *G06V 20/647* (2022.01); *G06T 2207/20081* (2013.01); *G06T 2207/20084* (2013.01); *G06T 2210/12* (2013.01)

(58) Field of Classification Search
CPC ...... G06V 10/764; G06V 10/82; G06V 20/58; G06V 20/647; G06V 10/25
See application file for complete search history.

(56) References Cited

U.S. PATENT DOCUMENTS

2019/0370606 A1\* 12/2019 Kehl .................. G06V 10/82
2020/0082180 A1\* 3/2020 Wang .................. G06T 7/80

\* cited by examiner

METHOD AND APPARATUS FOR DETECTING TARGET OBJECT IN IMAGE

CROSS-REFERENCE TO RELATED APPLICATIONS

This application claims priority to Chinese Patent Application No. 201911259327.X, filed on Dec. 10, 2019, titled "Method and apparatus for detecting target object in image," which is hereby incorporated by reference in its entirety.

TECHNICAL FIELD

Embodiments of the present disclosure relate to the field of computer technology, specifically to the field of artificial intelligence technology, and more specifically to a method and apparatus for detecting a target object in an image.

BACKGROUND

In road scenarios, location detection of traffic participants may provide effective assistance for smart transportation, autonomous driving, and smart city systems. At present, a three-dimensional target detection method in the road scenarios is mainly based on binocular cameras or radars to acquire three-dimensional data. This method requires high accuracy of the depth estimation algorithm, has high calculation complexity, and high costs. In addition, point clouds generated by the radars are relatively sparse in the distance, and the detection accuracy is low.

SUMMARY

Embodiments of the present disclosure propose a method and apparatus for detecting a target object in an image, a method and apparatus for training a neural network for detecting a target object, an electronic device and a computer readable medium.

In a first aspect, an embodiments of the present disclosure provides a method for detecting a target object in an image, the method including: performing following prediction operations using a pre-trained neural network: detecting a target object in a two-dimensional image to determine a two-dimensional bounding box of the target object; and determining a relative position constraint relationship between the two-dimensional bounding box of the target object and a three-dimensional projection bounding box obtained by projecting a three-dimensional bounding box of the target object into the two-dimensional image; and the method further including: determining the three-dimensional projection bounding box of the target object, based on the two-dimensional bounding box of the target object and the relative position constraint relationship between the two-dimensional bounding box of the target object and the three-dimensional projection bounding box.

In some embodiments, the determining a relative position constraint relationship between the two-dimensional bounding box of the target object and a three-dimensional projection bounding box obtained by projecting a three-dimensional bounding box of the target object into the two-dimensional image, includes: determining values of parameters in a preset parameter group corresponding to the target object; where, the preset parameter group includes at least two first parameter pairs and at least four second parameters; each of the first parameter pairs respectively represents a relative position of a vertex of the three-dimensional bounding box and the two-dimensional bounding box, and two parameters in the first parameter pair respectively represent: a relative position of a vertex on the three-dimensional bounding box and two vertices in a height direction of the two-dimensional bounding box, and a relative position of a vertex on the three-dimensional bounding box and two vertexes in a width direction of the two-dimensional bounding box; and each of the second parameters respectively represents a relative position of a vertex of the three-dimensional projection bounding box in a width or height direction of the two-dimensional bounding box, and two vertices of the two-dimensional bounding box in a same direction, and any one of the first parameter pairs and any one of the second parameters represent positions of different vertices of the three-dimensional projection bounding box relative to the two-dimensional bounding box.

In some embodiments, the determining a relative position constraint relationship between the two-dimensional bounding box of the target object and a three-dimensional projection bounding box obtained by projecting a three-dimensional bounding box of the target object into the two-dimensional image, further includes: determining a posture type of the target object from at least two preset posture types, wherein the posture type of the target object is related to a number of vertices blocked by the target object among vertices of the three-dimensional projection bounding box of the target object; and determining the preset parameter group corresponding to the target object according to the posture type of the target object.

In some embodiments, the posture type of the target object is further related to an orientation of the target object; and the determining the three-dimensional projection bounding box of the target object, based on the two-dimensional bounding box of the target object and the relative position constraint relationship between the two-dimensional bounding box of the target object and the three-dimensional projection bounding box, includes: determining coordinates of part of vertices of the three-dimensional projection bounding box based on coordinates of the vertices of the two-dimensional bounding box, the values of the parameters in the preset parameter group, and the posture type of the target object; and calculating coordinates of other vertices of the three-dimensional projection bounding box, based on the determined coordinates of the part of vertices of the three-dimensional projection bounding box, and a projection geometric relationship between the three-dimensional projection bounding box and the corresponding three-dimensional bounding box.

In some embodiments, the prediction operations further includes: classifying the target object to determine a category of the target object.

In a second aspect, an embodiment of the present disclosure provides a method for training a neural network for detecting a target object, the method including: acquiring sample data, the sample data comprising a sample image of a three-dimensional projection bounding box labeling the included target object, the three-dimensional projection bounding box being a projection of a corresponding three-dimensional bounding box in the sample image; and performing multiple iteration training on the neural network for detecting the target object based on the sample data; the iteration training including: using the current neural network for detecting the target object to perform following operations: detecting the target object in the sample image to obtain a detection result of a two-dimensional bounding box of the target object, and determining a relative position constraint relationship between the two-dimensional bounding box and the three-dimensional projection bounding box of the target object in the sample image; determining a detection result of the three-dimensional projection bounding box of the target object in the sample image, based on the detection result of the two-dimensional bounding box of the target object in the sample image and the relative position constraint relationship between the two-dimensional bounding box and the three-dimensional projection bounding box of the target object in the sample image; and updating parameters of the neural network for detecting the target object, based on a difference between the detection result of the three-dimensional projection bounding box of the target object in the sample image and the labeled three-dimensional projection bounding box of the target object in the sample image.

In some embodiments, the neural network for detecting the target object includes a two-dimensional regression branch and a three-dimensional regression branch, where the two-dimensional regression branch outputs the detection result of the two-dimensional bounding box of the target object in the sample image, and the three-dimensional regression branch determines the relative position constraint relationship between the two-dimensional bounding box and the three-dimensional projection bounding box of the target object in the sample image.

In some embodiments, the neural network for detecting the target object further includes a three-dimensional classification branch; and the iteration training further includes: determining a posture type of the target object using the three-dimensional classification branch, the posture type of the target object being related to a number of vertices blocked by the target object in vertices of the three-dimensional projection bounding box of the target object, and/or an orientation of the target object; and determining the relative position constraint relationship between the two-dimensional bounding box and the three-dimensional projection bounding box of the target object in the sample image according to the posture type of the target object by the three-dimensional regression branch.

In some embodiments, the sample data further includes category labeling information of the target object in the sample image, and the neural network for detecting the target object further includes a two-dimensional classification branch; and the iteration training further includes: classifying the target object using the two-dimensional classification branch, and updating the parameters of the neural network for detecting the target object based on a difference between a classification result of the target object and the category labeling information of the target object.

In a third aspect, an embodiment of the present disclosure provides an apparatus for detecting a target object in an image, the apparatus including: a prediction unit, configured to perform following prediction operations using a pre-trained neural network: detecting a target object in a two-dimensional image to determine a two-dimensional bounding box of the target object; and determining a relative position constraint relationship between the two-dimensional bounding box of the target object and a three-dimensional projection bounding box obtained by projecting a three-dimensional bounding box of the target object into the two-dimensional image; and a determination unit, configured to determine the three-dimensional projection bounding box of the target object, based on the two-dimensional bounding box of the target object and the relative position constraint relationship between the two-dimensional bounding box of the target object and the three-dimensional projection bounding box.

In some embodiments, the prediction unit is configured to determine a relative position constraint relationship between the two-dimensional bounding box of the target object and a three-dimensional projection bounding box obtained by projecting a three-dimensional bounding box of the target object into the two-dimensional image as follows: determining values of parameters in a preset parameter group corresponding to the target object; where, the preset parameter group comprises at least two first parameter pairs and at least four second parameters; each of the first parameter pairs respectively represents a relative position of a vertex of the three-dimensional bounding box and the two-dimensional bounding box, and two parameters in the first parameter pair respectively represent: a relative position of a vertex on the three-dimensional bounding box and two vertices in a height direction of the two-dimensional bounding box, and a relative position of a vertex on the three-dimensional bounding box and two vertexes in a width direction of the two-dimensional bounding box; and each of the second parameters respectively represents a relative position of a vertex of the three-dimensional projection bounding box in a width or height direction of the two-dimensional bounding box, and two vertices of the two-dimensional bounding box in a same direction, and any one of the first parameter pairs and any one of the second parameters represent positions of different vertices of the three-dimensional projection bounding box relative to the two-dimensional bounding box.

In some embodiments, the prediction unit is further configured to: determine a posture type of the target object from at least two preset posture types, where the posture type of the target object is related to a number of vertices blocked by the target object among vertices of the three-dimensional projection bounding box of the target object; and determine the preset parameter group corresponding to the target object according to the posture type of the target object.

In some embodiments, the posture type of the target object is further related to an orientation of the target object; and the determination unit is configured to determine the three-dimensional projection bounding box of the target object, based on the two-dimensional bounding box of the target object and the relative position constraint relationship between the two-dimensional bounding box of the target object and the three-dimensional projection bounding box as follows: determining coordinates of part of vertices of the three-dimensional projection bounding box based on coordinates of the vertices of the two-dimensional bounding box, the values of the parameters in the preset parameter group, and the posture type of the target object; and calculating coordinates of other vertices of the three-dimensional projection bounding box, based on the determined coordinates of the part of vertices of the three-dimensional projection bounding box, and a projection geometric relationship between the three-dimensional projection bounding box and the corresponding three-dimensional bounding box.

In some embodiments, the prediction operations further include: classifying the target object to determine a category of the target object.

In a fourth aspect, an embodiment of the present disclosure provides an apparatus for training a neural network for detecting a target object, the apparatus including: an acquisition unit, configured to acquire sample data, the sample data including a sample image of a three-dimensional projection bounding box labeling the included target object, the three-dimensional projection bounding box being a projection of a corresponding three-dimensional bounding box in the sample image; and a training unit, configured to perform multiple iteration training on the neural network for detecting the target object based on the sample data; the iteration training including: using the current neural network for detecting the target object to perform following operations: detecting the target object in the sample image to obtain a detection result of a two-dimensional bounding box of the target object, and determining a relative position constraint relationship between the two-dimensional bounding box and the three-dimensional projection bounding box of the target object in the sample image; determining a detection result of the three-dimensional projection bounding box of the target object in the sample image, based on the detection result of the two-dimensional bounding box of the target object in the sample image and the relative position constraint relationship between the two-dimensional bounding box and the three-dimensional projection bounding box of the target object in the sample image; and updating parameters of the neural network for detecting the target object, based on a difference between the detection result of the three-dimensional projection bounding box of the target object in the sample image and the labeled three-dimensional projection bounding box of the target object in the sample image.

In some embodiments, the neural network for detecting the target object includes a two-dimensional regression branch and a three-dimensional regression branch, where the two-dimensional regression branch outputs the detection result of the two-dimensional bounding box of the target object in the sample image, and the three-dimensional regression branch determines the relative position constraint relationship between the two-dimensional bounding box and the three-dimensional projection bounding box of the target object in the sample image.

In some embodiments, the neural network for detecting the target object further includes a three-dimensional classification branch; and the iteration training further includes: determining a posture type of the target object using the three-dimensional classification branch, the posture type of the target object being related to a number of vertices blocked by the target object in vertices of the three-dimensional projection bounding box of the target object, and/or an orientation of the target object; and determining the relative position constraint relationship between the two-dimensional bounding box and the three-dimensional projection bounding box of the target object in the sample image according to the posture type of the target object by the three-dimensional regression branch.

In some embodiments, the sample data further comprises category labeling information of the target object in the sample image, and the neural network for detecting the target object further includes a two-dimensional classification branch; and the iteration training further includes: classifying the target object using the two-dimensional classification branch, and updating the parameters of the neural network for detecting the target object based on a difference between a classification result of the target object and the category labeling information of the target object.

In a fifth aspect, an embodiment of the present disclosure provides an electronic device, including: one or more processors; and a storage apparatus, for storing one or more programs, the one or more programs, when executed by the one or more processors, cause the one or processors to implement the method for detecting a target object in an image according to the first aspect, or the method for training a neural network for detecting a target object according to the second aspect.

In a sixth aspect, an embodiment of the present disclosure provides a computer readable medium, storing a computer program thereon, the program, when executed by a processor, implements the method for detecting a target object in an image according to the first aspect, or the method for training a neural network for detecting a target object according to the second aspect.

The method and apparatus for detecting a target object in an image, the electronic device and the computer readable medium of the above embodiments of the present disclosure, by first performing following prediction operations using a pre-trained neural network: detecting a target object in a two-dimensional image to determine a two-dimensional bounding box of the target object; and determining a relative position constraint relationship between the two-dimensional bounding box of the target object and a three-dimensional projection bounding box obtained by projecting a three-dimensional bounding box of the target object into the two-dimensional image; then determining the three-dimensional projection bounding box of the target object, based on the two-dimensional bounding box of the target object and the relative position constraint relationship between the two-dimensional bounding box of the target object and the three-dimensional projection bounding box, thus, the trained neural network may be used to quickly obtain more accurate three-dimensional position detection results, and the detection accuracy of target objects at different distances is consistent, which solves the problem of low detection accuracy of the target objects at the far end.

The method and apparatus for training a neural network for detecting a target object, the electronic device and the computer readable medium of the above embodiments of the present disclosure, by acquiring sample data, the sample data including a sample image of a three-dimensional projection bounding box labeling the included target object, the three-dimensional projection bounding box being a projection of a corresponding three-dimensional bounding box in the sample image; and performing multiple iteration training on the neural network for detecting a target object based on the sample data; the iteration training including: using the current neural network for detecting a target object to perform following operations: detecting the target object in the sample image to obtain a detection result of a two-dimensional bounding box of the target object, and determining a relative position constraint relationship between the two-dimensional bounding box and the three-dimensional projection bounding box of the target object in the sample image; determining a detection result of the three-dimensional projection bounding box of the target object in the sample image, based on the detection result of the two-dimensional bounding box of the target object in the sample image and the relative position constraint relationship between the two-dimensional bounding box and the three-dimensional projection bounding box of the target object in the sample image; and updating parameters of the neural network for detecting a target object, based on a difference between the detection result of the three-dimensional projection bounding box of the target object in the sample image and the labeled three-dimensional projection bounding box of the target object in the sample image, thus, the position constraint relationship between the two-dimensional bounding box and the three-dimensional projection bounding box of the target object is used to train the neural network, so that the neural network can learn more accurate position information more accurately, which is beneficial to improve the accuracy of the neural network for detecting a target object.

BRIEF DESCRIPTION OF THE DRAWINGS

By reading the detailed description of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with accompanying drawings and embodiments. It may be appreciated that the specific embodiments described herein are merely used for explaining the relevant disclosure, rather than limiting the disclosure. In addition, it should also be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
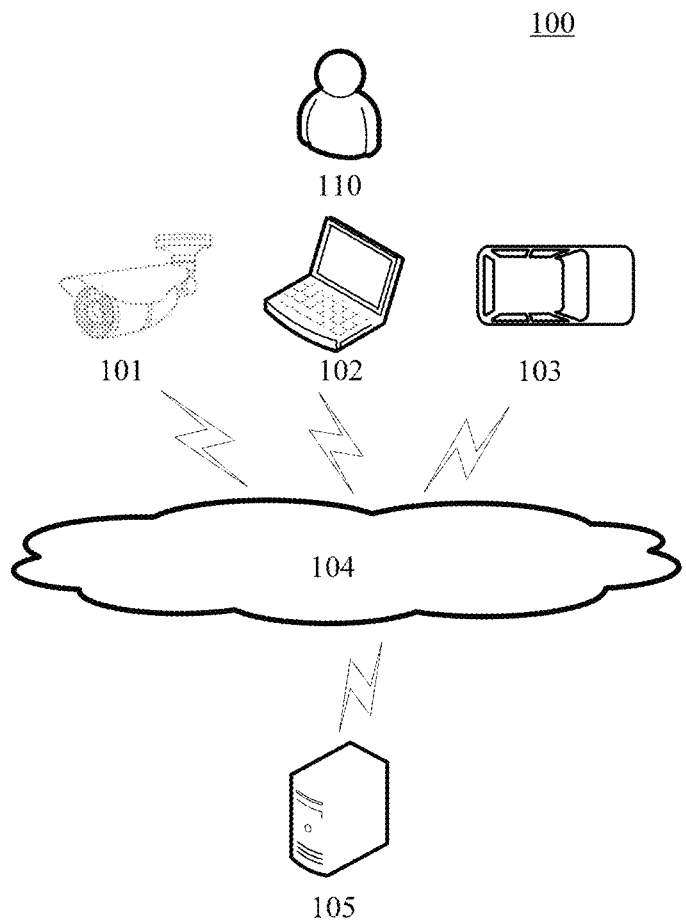
FIG. 1 is a diagram of an exemplary system architecture in which embodiments of the present disclosure may be implemented.

FIG. 1 illustrates an exemplary system architecture 100 in which a method for detecting a target object in an image or an apparatus for detecting a target object in an image of embodiments of the present disclosure may be implemented.

As shown in FIG. 1, the system architecture 100 may include an image acquisition device 101, a terminal device 102, an autonomous vehicle 103, a network 104 and a server 105. The network 104 is used to provide a communication link medium between the image acquisition device 101, the terminal device 102, the autonomous vehicle 103 and the server 105. The network 104 may include various types of connections, such as wired, wireless communication links, or optic fibers.

The image acquisition device 101, the terminal device 102, and the autonomous vehicle 103 interact with the server 105 through the network 104 to receive or send data. The image acquisition device 101 may be a device for acquiring images, such as a surveillance camera, an in-vehicle camera of the autonomous vehicle, and so on. The terminal device 102 may be a terminal connected to the device that acquires images, for example, mobile devices such as in-vehicle terminals, mobile phones or portable computers, desktop computers, etc. The autonomous vehicle 103 may be installed with an in-vehicle camera, and has an in-vehicle processing unit, where the in-vehicle processing unit may acquire images acquired by the in-vehicle camera.

The image acquisition device 101, the terminal device 102 may be hardware or software. When the image acquisition device 101, the terminal device 102 are hardware, they may be various electronic devices. When the image acquisition device 101 and the terminal device 102 are software, they may be installed in various electronic devices. It may be implemented as a plurality of software or software modules (for example, a plurality of software or software modules used to provide distributed services) or as a single software or software module, which is not specifically limited herein.

The server 105 may be a server running a target object detection service. The server 105 may collect image data from the image acquisition device 101, the terminal device 102, and the autonomous vehicle 103, and perform target detection on the image data. Alternatively, the server 105 may train a neural network for detecting an target object based on the collected image data.

In practice, the server 105 may directly connect with the image acquisition device 101 (such as a road surveillance camera) or in response to an instruction from a user 110, connect to the image acquisition device 101 to acquire image data collected in real time, run the neural network for detecting a target object, to obtain an detection result of the target object. Alternatively, the terminal device 102 or the autonomous vehicle 103 may voluntarily or according to the instruction of the user 110, send a two-dimensional image and a target detection request to the server 105, and the server 105 may receive the image and the target detection request to detect the target object in the image, then, return a detection result to the terminal device 102 or the autonomous vehicle 103. The autonomous vehicle 103 may make a driving decision based on the received detection result.

It should be noted that the method for detecting a target object in an image or the method for training a neural network for detecting a target object provided by embodiments of the present disclosure is generally performed by the server 105, and correspondingly, the apparatus for detecting a target object in an image or the apparatus for training a neural network for detecting a target object is generally provided in the server 105.

In some scenarios, the server 105 may acquire the two-dimensional image to be detected from a database, a memory, or other devices. In this regard, the exemplary system architecture 100 may not include the image acquisition device 101, the terminal device 102, and the autonomous vehicle 103.

It should be noted that the server 105 may be hardware or software. When the server 105 is hardware, it may be implemented as a distributed server cluster composed of a plurality of servers or as a single server. When the server 105 is software, it may be implemented as a plurality of software or software modules (for example, a plurality of software or software modules used to provide distributed services) or as a single software or software module, which is not specifically limited herein.

In some scenarios, the terminal device 102 and the autonomous vehicle 103 may have data processing capabilities, and the terminal device 102 and the autonomous vehicle 103 may perform target object detection on the image locally, that is, the method for detecting a target object in an image provided by the embodiments of the present disclosure may be performed by the terminal device 102 or the autonomous vehicle 103, correspondingly, the apparatus for detecting a target object in an image may be provided in the terminal device 102 or the autonomous vehicle 103, in this regard, the exemplary system architecture 100 may not have the server 105.

It should be understood that the number of image acquisition devices, terminal devices, autonomous vehicles, networks, and servers in FIG. 1 is merely illustrative. Depending on the implementation needs, there may be any number of image acquisition devices, terminal devices, autonomous vehicles, networks, and servers.

Figure 2:
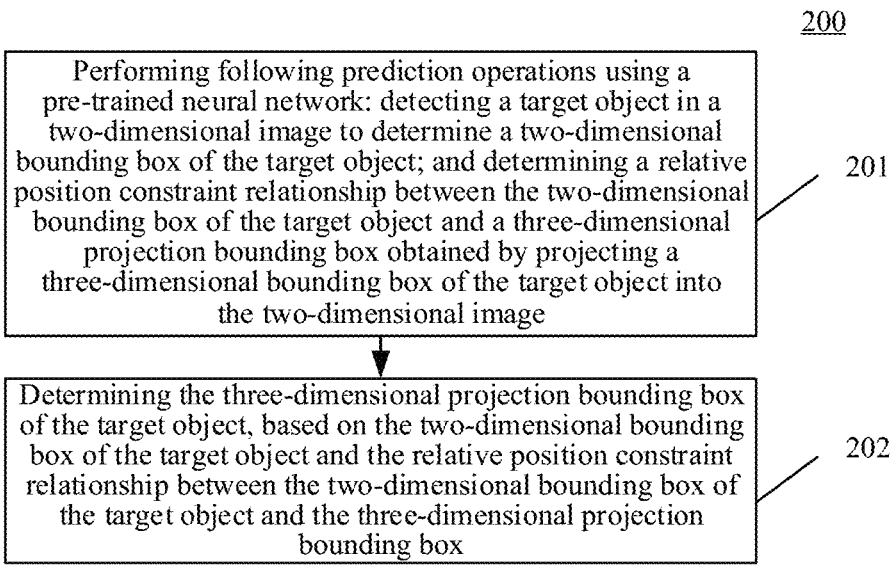
FIG. 2 is a flowchart of a method for detecting a target object in an image according to an embodiment of the present disclosure.

With further reference to FIG. 2, a flow 200 of a method for detecting a target object in an image according to an embodiment of the present disclosure is illustrated. The method for detecting a target object in an image includes the following steps.

Step 201, performing prediction operations using a pre-trained neural network.

In the present embodiment, a pre-trained neural network may be acquired first. The pre-trained neural network is a neural network for executing a target object detection task, which may be obtained by training based on sample data in advance. An executing body of the above method for detecting a target object in an image may run the pre-trained neural network, so that the neural network performs the detection of the target object.

The above prediction operation includes: detecting a target object in a two-dimensional image to determine a two-dimensional bounding box of the target object; and determining a relative position constraint relationship between the two-dimensional bounding box of the target object and a three-dimensional projection bounding box obtained by projecting a three-dimensional bounding box of the target object into the two-dimensional image.

In the training of the neural network, a corresponding training task or training target may be specified in advance. In the present embodiment, the training task or training target of the neural network may be specified as predicting the two-dimensional bounding box of the target object in the image and the relative position constraint relationship between the two-dimensional bounding box and the three-dimensional projection bounding box. Then, after the training, the neural network may execute the corresponding prediction task.

Here, the target object may be an entity object such as a person, an animal, a plant, an object, or a logo. For example, in a road scenario, the target object in a two-dimensional image may include a vehicle, a pedestrian, a traffic sign, or the like. In practice, the two-dimensional image may contain a plurality of target objects, and each target object may be detected separately, or the category of the target object may be specified, and only the target object of the specified category may be detected. For example, if it is specified that the target object is the vehicle category, only vehicle in the two-dimensional image is detected.

The two-dimensional bounding box of the target object is the smallest rectangular box enclosing the target object. The three-dimensional bounding box is the smallest cuboid bounding box in three-dimensional space. The three-dimensional projection bounding box is a projection of the three-dimensional bounding box in the two-dimensional image, that is, the eight vertices of the three-dimensional bounding box are projected into the two-dimensional two-dimensional image and then the projection box is formed by connecting them in sequence.

Both the two-dimensional bounding box and the three-dimensional projection bounding box are determined by the boundary position of the target object. There is a certain relative position constraint relationship between the two-dimensional bounding box and the three-dimensional projection bounding box of a given target object. For example, an area difference between the two-dimensional bounding box and the three-dimensional projection bounding box of the target object is within a certain range, a distance constraint between the vertices of the two-dimensional bounding box and the vertices of the three-dimensional bounding box, a proportional relationship between the coordinates of the vertices of the two-dimensional bounding box and the coordinates of the vertices of the three-dimensional projection bounding box, a distance constraint between the center point of the target object calculated according to the two-dimensional bounding box and the center point of the target object calculated according to the three-dimensional projection bounding box.

The pre-trained neural network may first perform feature extraction on the two-dimensional image, segment the target object based on the extracted features, and determine the two-dimensional bounding box of the target object using a regression method. The pre-trained neural network may also predict the relative position constraint relationship between the two-dimensional bounding box and the three-dimensional projection bounding box based on the extracted features. Alternatively, after extracting the features and obtaining the two-dimensional bounding box of the target object, the relative position constraint relationship between the two-dimensional bounding box and the three-dimensional projection bounding box of the target object is obtained using a classification or regression method, based on the extracted features and the two-dimensional bounding box.

Alternatively, the above neural network may be trained based on the image of the two-dimensional bounding box and the three-dimensional projection bounding box labeling the same target object, then the neural network may learn the relative position constraint relationship between the two-dimensional bounding box and the three-dimensional projection bounding box of the same target object in the image. When applied to detecting the target object in the two-dimensional image, the neural network may determine the relative position constraint relationship between the two-dimensional bounding box and the three-dimensional projection bounding box of the target object based on the feature of the two-dimensional image.

Here, the relative position constraint relationship may include a proportional relationship satisfied between the coordinates of several vertices of the two-dimensional bounding box and the coordinates of several vertices of the three-dimensional projection bounding box, or a distance relationship between the center point coordinates of the two-dimensional bounding box and the three-dimensional projection bounding box, or a relationship between the angles between several boundaries of the two-dimensional bounding box and several boundaries of the three-dimensional projection bounding box, etc.

Figure 3A:
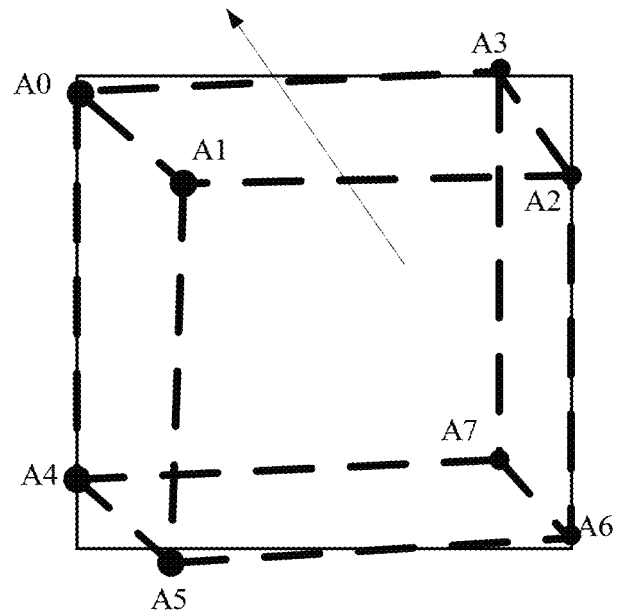
FIGS. 3A, 3B, and 3C are schematic diagrams of a relative position relationship between a two-dimensional bounding box and a three-dimensional projection bounding box of a target object.
Figure 3B:
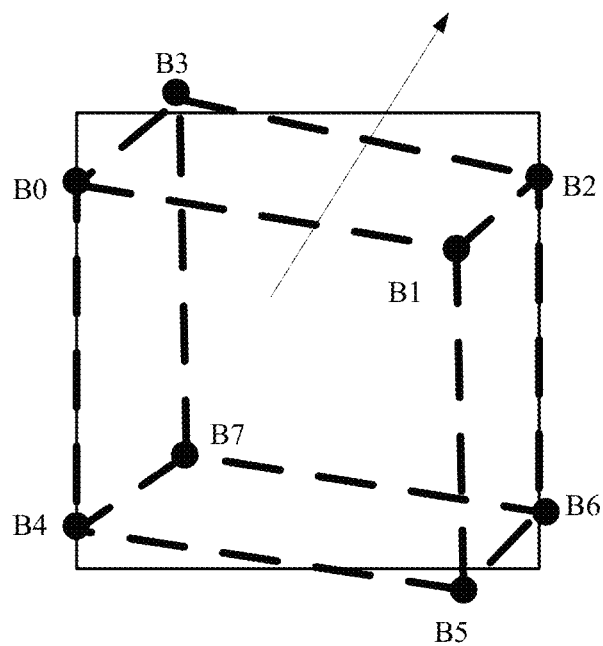
Figure 3C:
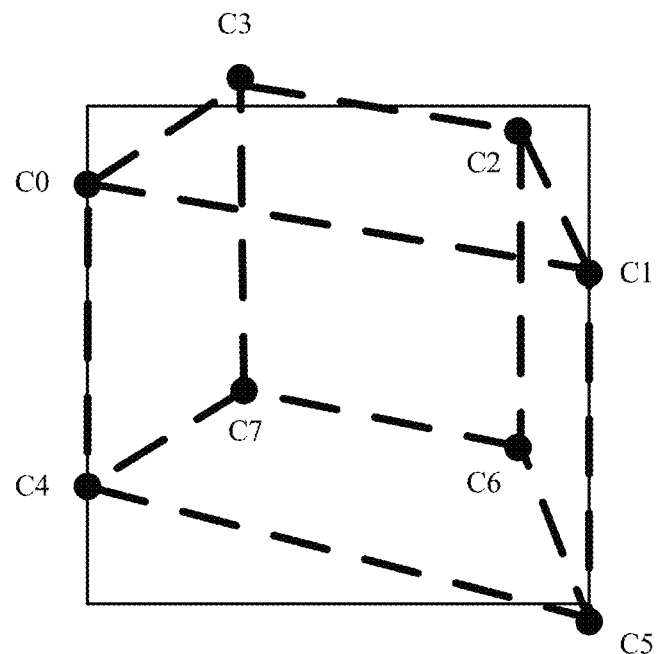

With reference to FIG. 3A, FIG. 3B and FIG. 3C, respectively showing examples of three situations of the relative position relationship between the two-dimensional bounding box and the three-dimensional projection bounding box of the same target object in the two-dimensional image. The solid line rectangular box is the two-dimensional bounding box, and the dotted line box is the three-dimensional projection bounding box.

In FIG. 3A, in the eight vertices of the three-dimensional projection bounding box, A0, A4, A2, A6, A1, and A7 are within the two-dimensional bounding box or fall on the boundary of the two-dimensional bounding box, the remaining two vertices A3, A5 are outside the two-dimensional projection bounding box, and only one vertex A7 is blocked by the target object in the two-dimensional image. In FIG. 3B, in the eight vertices of the three-dimensional projection bounding box, B0, B4, B2, B6, B1, and B7 are within the two-dimensional bounding box or fall on the boundary of the two-dimensional bounding box, the remaining two vertices B3, B5 are outside the two-dimensional projection bounding box, and only one vertex B7 is blocked by the target object in the two-dimensional image. The directions of the arrows in FIGS. 3a and 3b are the orientations of the target objects. It can be seen that in FIGS. 3a and 3b, the relative position relationship between the vertices of the two-dimensional bounding box and the vertices of the three-dimensional projection bounding box of the same target object is similar, but the orientation of the target objects varies greatly.

In FIG. 3C, in the eight vertices of the three-dimensional projection bounding box, C0, C4, C2, C1, C6 and C7 are within the two-dimensional bounding box or fall on the boundary of the two-dimensional bounding box, the remaining two vertices C3, C5 are outside the two-dimensional bounding box, and only two vertices C6 and C7 are blocked by the target object in the two-dimensional image.

As can be seen from FIGS. 3a, 3b, and 3c, the relative position between the vertices of the two-dimensional bounding box and the three-dimensional projection bounding box (that is, an example of the relative position constraint relationship between the two-dimensional bounding box and the three-dimensional projection bounding box of the target object) may change as the shape and posture of the target object change. Correspondingly, the pre-trained neural network may extract the relative position relationship between the vertices of the two-dimensional bounding box and the three-dimensional projection bounding box.

In some alternative implementations of the present embodiment, the prediction operations may further include: classifying the target object to determine a category of the target object. The pre-trained neural network may also identify the category of the target object, thereby providing a richer detection result.

For example, in a road scenario, the type of vehicle may be identified, such as a truck, a car, or an electric car. This type information may help autonomous vehicles on the road to identify the types of obstacles, so as to make more accurate driving decisions.

Step 202, determining the three-dimensional projection bounding box of the target object, based on the two-dimensional bounding box of the target object and the relative position constraint relationship between the two-dimensional bounding box of the target object and the three-dimensional projection bounding box.

The executing body of the method for detecting a target object in an image may directly calculate or fit to obtain the three-dimensional projection bounding box of the target object, based on the two-dimensional bounding box of the target object predicted by the neural network and the relative position constraint relationship between the two-dimensional bounding box of the target object and the three-dimensional projection bounding box, to obtain a three-dimensional position detection result of the target object in the two-dimensional image.

Specifically, taking the relative position constraint relationship between the two-dimensional bounding box of the target object and the three-dimensional projection bounding box as the distance constraint between the vertices of the two, for example, after the two-dimensional bounding box is determined, the coordinates of the vertices of the two-dimensional bounding box may be obtained, and then the coordinates of the corresponding vertices in the three-dimensional projection bounding box may be calculated by fitting or regression based on the distance constraint.

The method for detecting a target object in an image provided by the above embodiment of the present disclosure, by first performing the following prediction operations using a pre-trained neural network: detecting a target object in a two-dimensional image to determine a two-dimensional bounding box of the target object; and determining a relative position constraint relationship between the two-dimensional bounding box of the target object and a three-dimensional projection bounding box obtained by projecting a three-dimensional bounding box of the target object into the two-dimensional image; then determining the three-dimensional projection bounding box of the target object, based on the two-dimensional bounding box of the target object and the relative position constraint relationship between the two-dimensional bounding box of the target object and the three-dimensional projection bounding box, thereby realizing the fast and accurate detection of the three-dimensional position of the target object, and the detection accuracy of target objects at different distances is consistent, which solves the problem of low detection accuracy of the target objects at the far end. Since the relative position constraint between the two-dimensional bounding box and the three-dimensional projection bounding box is used in the detection, the accuracy of the detection result can be improved.

In some alternative implementations of the present embodiment, the neural network may determine the relative position constraint relationship between the two-dimensional bounding box of the target object and the three-dimensional projection bounding box obtained by projecting the three-dimensional bounding box of the target object into the two-dimensional image by performing the following operations: determining values of parameters in a preset parameter group corresponding to the target object; where, the preset parameter group includes at least two first parameter pairs and at least four second parameters; each of the first parameter pairs respectively represents a relative position of a vertex of the three-dimensional bounding box and the two-dimensional bounding box, and two parameters in the first parameter pair respectively represent: a relative position of a vertex on the three-dimensional bounding box and two vertices in a height direction of the two-dimensional bounding box, and a relative position of a vertex on the three-dimensional bounding box and two vertexes in a width direction of the two-dimensional bounding box; and each of the second parameters respectively represents a relative position of a vertex of the three-dimensional projection bounding box in a width or height direction of the two-dimensional bounding box and two vertices of the two-dimensional bounding box in the same direction, and any one of the first parameter pairs and any one of the second parameters represent positions of different vertices of the three-dimensional projection bounding box relative to the two-dimensional bounding box.

Specifically, a preset parameter group including at least eight parameters may be used to represent the relative position constraint relationship between the two-dimensional bounding box and the three-dimensional projection bounding box. Assume that the coordinates of the top left vertex and bottom right vertex of the two-dimensional bounding box are $(x_1, y_1)$, $(x_2, y_2)$, width $W_{2d}=x_2-x_1$ height $H_{2d}=y_2-y_1$, respectively. The vertex coordinates numbered m in the three-dimensional projection bounding box (the vertices A1, A2, A3, A4, A5, A6, and A7 in FIG. 3A are numbered 1, 2, 3, 4, 5, 6, 7, respectively; and the vertices B1, B2, B3, B4, B5, B6, and B7 in FIG. 3B are numbered 1, 2, 3, 4, 5, 6, 7, respectively) are expressed as B3d (m), B3d (m). x and B3d (m). x represents the abscissa (coordinate in the width direction) and ordinate (coordinate in the height direction) of the vertex, respectively, m=0, 1, 2, 3, 4, 5, 6, 7. Taking the situation shown in FIG. 3A as an example, the corresponding preset parameter group $L_1=\{L_1(0), L_1(1), L_1(2), L_1(3), \ldots, \}$ includes at least the following eight parameters:

$$L_1(j) = \frac{(y_2 - B3d(i).y)}{H_{2d}}, i = 0, 1, 2, 6; j = 0, 1, 2, 3 \quad (1)$$

$$L_1(4) = \frac{(B3d(3).x - x_1)}{W_{2d}} \quad (2)$$

$$L_1(5) = \frac{(B3d(3).y - y_1)}{H_{2d}} \quad (3)$$

$$L_1(6) = \frac{(B3d(5).x - x_1)}{W_{2d}} \quad (4)$$

$$L_1(7) = \frac{(B3d(5).y - y_1)}{H_{2d}} \quad (5)$$

The above eight parameters include a first parameter pair $L_1$ (4) and $L_1$ (5) that represents the relative position of the vertex B3d (3) of the three-dimensional bounding box relative to the top left vertex and the bottom right vertex of the two-dimensional bounding box, and a first parameter pair $L_1$ (6) and $L_1$ (7) that represents the relative position of the vertex B3d (5) of the three-dimensional bounding box relative to the top left vertex and the bottom right vertex of the two-dimensional bounding box. Here, $L_1$ (4) and $L_1$ (5) respectively represent the relative positions of the vertex B3d (3) and two vertices of the two-dimensional bounding box in the height direction. $L_1$ (4) is specifically expressed as the ratio of the distance between the vertex B3d (3) in the height direction and the top left vertex of the two-dimensional bounding box and the total height of the two-dimensional bounding box, and $L_1$ (5) is specifically expressed as a ratio value of the distance between the vertex B3d (3) in the width direction and the top left vertex of the two-dimensional bounding box and the total width of the two-dimensional bounding box.

The above eight parameters further include the relative position of the vertices of the three-dimensional bounding box B3d (0), B3d (1), B3d (6), and B3d (2) in the height direction and two vertices of the two-dimensional bounding box in the height direction, specifically expressed as a ratio value of the distance between the vertices B3d (0), B3d (1), B3d (6), B3d (2) in the height direction and the top left vertex of the two-dimensional bounding box, and the total height of the two-dimensional bounding box.

In the two-dimensional image with only two vertices blocked by the target object in the three-dimensional projection bounding box of the target object (as shown in FIGS. 3a and 3b), the eight parameters of the above formulas (1)-(5) may be used to represent the relative position constraint relationship between the two-dimensional bounding box of the target object and the three-dimensional projection bounding box. Alternatively, the preset parameter group may further include other parameters representing the relative position relationship between the two-dimensional bounding box and the three-dimensional projection bounding box, for example, the ratio value of the distance between the other vertices of the three-dimensional projection bounding box and the top left vertex or bottom right vertex of the two-dimensional bounding box, and the height or width of the two-dimensional bounding box. Then, the pre-trained neural network may predict the value of each parameter in the preset parameter group.

By predicting the value of the preset parameter group that represents the relative position constraint relationship between the two-dimensional bounding box and the three-dimensional projection bounding box using the neural network, the potential position relationship between the two-dimensional bounding box and the three-dimensional projection bounding box may be effectively used, to more accurately detect the position of the three-dimensional projection bounding box.

In addition, the above method may predict the relative position constraint relationship between the two-dimensional bounding box and the three-dimensional projection bounding box by predicting at least eight parameters, and then the coordinates of the vertices of the three-dimensional bounding box may be calculated based on the parameter values of the at least eight parameters. Compared with the current method of directly predicting 16-dimensional coordinate values of the eight vertices of the three-dimensional projection bounding box, the above method effectively reduces the number of data dimensions to be predicted and reduces redundant calculation of the neural network, which can help to improve the detection efficiency of the target object.

Further and alternatively, before determining the value of each parameter in the preset parameter group corresponding to the target object, the posture type of the target object may also be determined from at least two preset posture types, and then according to the posture type of the target object, the preset parameter group corresponding to the target object is determined. The posture type of the target object is related to the number of vertices blocked by the target object in the vertices of the three-dimensional projection bounding box of the target object.

In order to reduce the number of preset parameter groups as much as possible while ensuring that the parameters in the preset parameter groups may completely and accurately represent the relative position constraint relationship between the two-dimensional bounding box and the three-dimensional projection bounding box, parameter groups corresponding to target objects of various posture types may be set in advance. Here, the posture type of the target object may be preset, and may be classified based on the number of vertices blocked by the target object in the vertices of the three-dimensional projection bounding box of the target object, for example, as shown in FIGS. 3a and 3b, the case where the number of blocked vertices is 1 is regarded as one posture type, and the case where the number of blocked vertices shown in FIG. 3C is 2 is regarded as another posture type.

For example, the situation shown in FIGS. 3a and 3b is that one of the vertices of the three-dimensional projection bounding box is blocked by the target object (respectively vertices A7 and B7). Both the posture types of the target objects in FIG. 3A and FIG. 3B may use one set of parameters represented by the above formulas (1)-(5) as the corresponding preset parameter group.

The situation shown in FIG. 3C is as follows: two of the vertices of the three-dimensional projection bounding box are blocked by the target object (vertices C7 and C6). A preset parameter group $L_2=\{L_2(0), L_2(1), L_2(2), L_2(3), \ldots, \}$ corresponding to the posture type of the target object in FIG. 3C may be set to include at least one set of parameters of the following formulas (6)-(10):

$$L_2(j) = \frac{(y_2 - B3d(i).y)}{H_{2d}}, i = 0, 4, 5, 1; j = 0, 1, 2, 3 \quad (6)$$

$$L_2(4) = \frac{(B3d(3).x - x_1)}{W_{2d}} \quad (7)$$

$$L_2(5) = \frac{(B3d(3).y - y_1)}{H_{2d}} \quad (8)$$

$$L_2(6) = \frac{(B3d(5).x - x_1)}{W_{2d}} \quad (9)$$

$$L_2(7) = \frac{(B3d(5).y - y_1)}{H_{2d}} \quad (10)$$

Here, B3d (m) represents the vertex numbered m in the three-dimensional projection bounding box (the vertices C1, C2, C3, C4, C5, C6, and C7 in FIG. 3C are numbered 1, 2, 3, 4, 5, 6, 7, respectively), B3d (m).x and B3d(m).y respectively represent the abscissas and ordinates of the vertex.

By classifying the posture of the target object, the values of the parameters in the preset parameter group that can more accurately express the relative position constraint relationship between the two-dimensional bounding box and the three-dimensional projection bounding box of the target objects of different posture types may be targeted predicted, thereby improving the accuracy of the detection result of the three-dimensional projection bounding box of the target object.

Further, the posture type of the target object may also be related to the orientation of the target object. For example, if the orientations of the target objects in FIG. 3A and FIG. 3B are different, the corresponding posture types of the target objects are different. The situations in FIGS. 3a and 3b both use parameter groups represented by the above formulas (1)-(5) to represent the relative position constraint relationship between the two-dimensional bounding box and the three-dimensional bounding box. However, when the posture type of the target object changes slightly from the situation shown in FIG. 3A to the situation shown in FIG. 3B, the value of the above parameter $L_1$ (6) may gradually change from a small value close to 0 to 0, and then mutate to a larger value close to 1. Then, in the situation that the neural network cannot well distinguish FIGS. 3a and 3b during training, should the value of $L_1$ (6) take a larger value or a smaller value, that is, it may bring ambiguity in the learning of the neural network, which may affect the reliability of the trained neural network.

In the above implementation, the posture type of the target object is distinguished based on the orientation of the target object, where the value of the parameter $L_1$ (6) corresponding to the posture type of the target object in FIG. 3A is not greater than 0.5, and the value of the parameter $L_1$ (6) corresponding to the posture type of the target object in FIG. 3B is greater than 0.5. In this way, the ambiguity generated in the training of the neural network may be effectively avoided, so that the neural network can learn more reliable parameter value prediction logic, thereby more accurately predicting the value of each parameter in the preset parameter group.

In this case, the three-dimensional projection bounding box of the target object may be continuously determined as follows.

First, determining coordinates of part of vertices of the three-dimensional projection bounding box based on coordinates of the vertices of the two-dimensional bounding box, the values of the parameters in the preset parameter group, and the posture type of the target object.

Specifically, the preset parameter group corresponding to the target object may be determined as the above $L_1$ or $L_2$ according to the posture type of the target object determined by the neural network (one of the three posture types shown in FIGS. 3a, 3b, and 3c). Then, the abscissas and ordinates of the corresponding vertex may be calculated according to the corresponding formulas (1)-(5) or formulas (6)-(10).

Taking the posture type shown in FIG. 3A as an example, after the neural network may predict the values of the parameters in the parameter group $L_1$, the vertex coordinates $(x_1, y_1)$ and $(x_2, y_2)$ of the two-dimensional bounding box may be used to calculate the abscissas and ordinates of the vertices A3 (B3d (3).x, B3d (3).y) and A5 (B3d (5).x, B3d (5).y) of the three-dimensional projection bounding box, and the ordinate values B3d (0).y, B3d (1).y, B3d(2).y, B3d(6).y of the vertices A0, A1, A2, A6. In addition, the left and right boundaries of the two-dimensional bounding box and the three-dimensional projection bounding box coincide, so that the abscissa values of the vertices A1, A1, A2, and A6 may be obtained, thereby obtaining the coordinates of the six vertices.

Then, based on the determined coordinates of the part of vertices of the three-dimensional projection bounding box, and a projection geometric relationship between the three-dimensional projection bounding box and the corresponding three-dimensional bounding box, coordinates of other vertices of the three-dimensional projection bounding box may be calculated.

According to the principle of projection geometry, parallel lines in the three-dimensional world may intersect at the same point in an two-dimensional image, and the point is the vanishing point corresponding to the group of parallel lines. After determining the coordinates of the above six vertices, the coordinates of the remaining two vertices of the three-dimensional bounding box may be calculated by solving the vanishing point.

Figure 4:
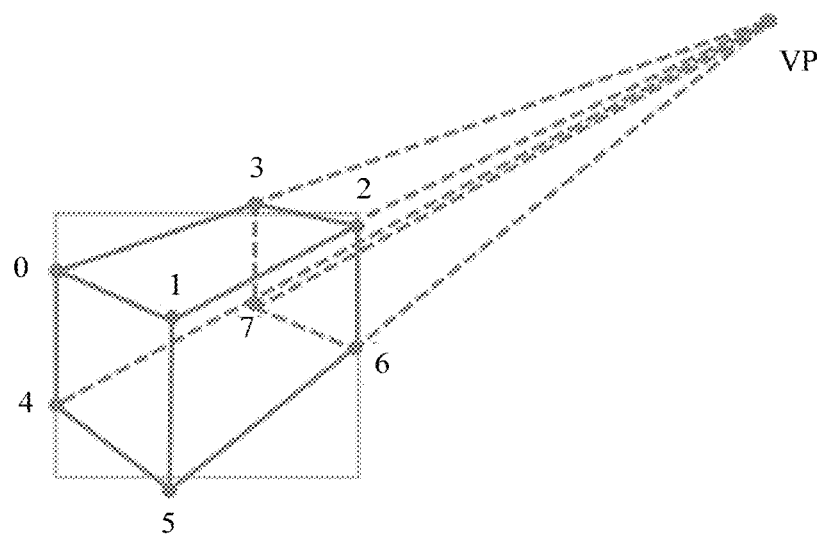
FIG. 4 is a schematic diagram of a principle of solving coordinates of other vertices based on coordinates of known vertices in the three-dimensional projection bounding box.

As shown in FIG. 4, in the real world, $l_{//03}$ intersects with $l_{//12}$, $l_{//47}$, and $l_{//56}$ at the vanishing point (VP), and the ordinates of the vertices A1 and A7 may be solved.

In this way, the coordinates of all vertices of the three-dimensional projection bounding box may be calculated, realizing the accurate detection of the three-dimensional position of the target object based on the two-dimensional image.

Figure 5:
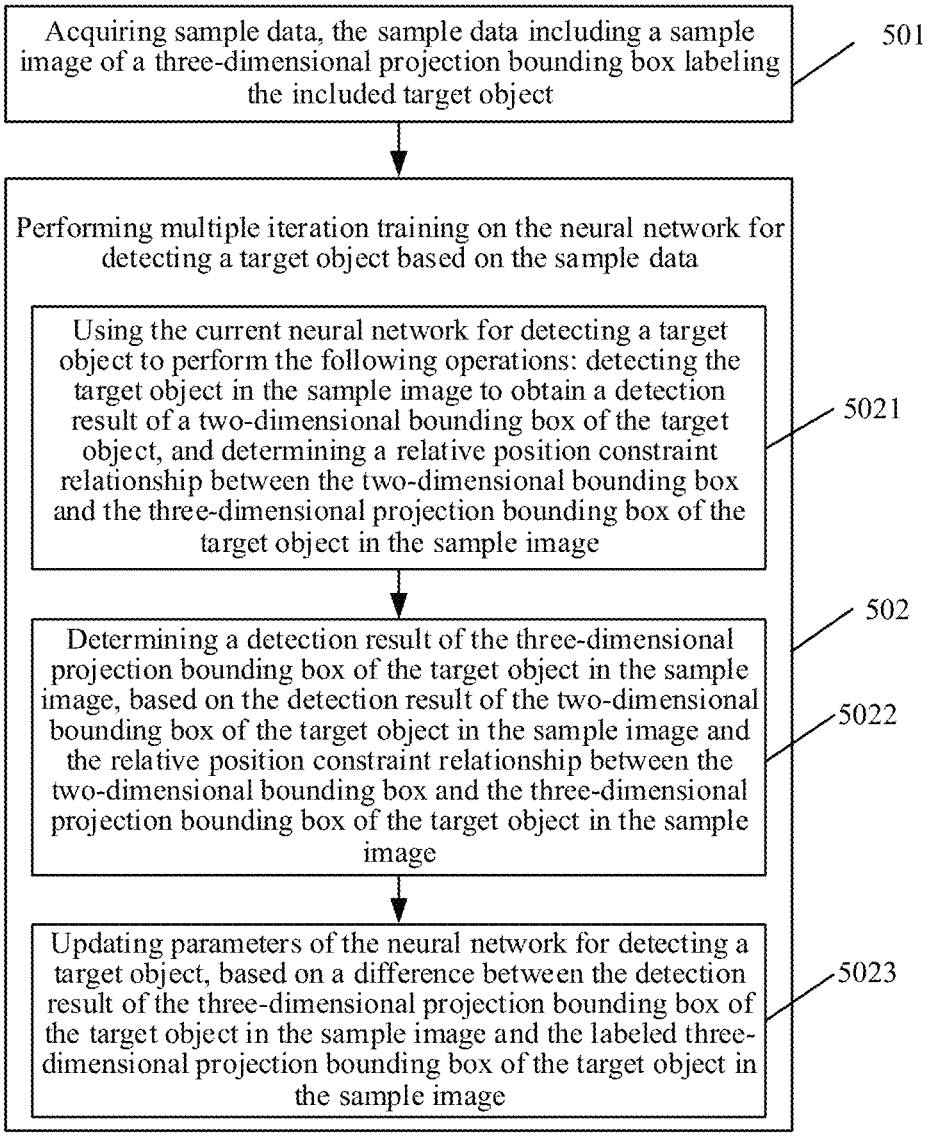
FIG. 5 is a flowchart of a method for training a neural network for detecting a target object according to an embodiment of the present disclosure.

An embodiment of the present disclosure further provides a method for training a neural network for detecting a target object. With reference to FIG. 5, a flow 500 of an embodiment of the method for training a neural network for detecting a target object is illustrated. The flow 500 includes the following steps.

Step 501, acquiring sample data, the sample data including a sample image of a three-dimensional projection bounding box labeling the included target object.

In the present embodiment, an executing body of the method for training a neural network for detecting a target object (for example, the server shown in FIG. 1) may acquire a large number of sample images from an image acquisition device, a database, or other electronic devices, and acquire labeling data of a two-dimensional bounding box and the three-dimensional projection bounding box of the target object in the sample image. Here, the three-dimensional projection bounding box is a projection of a corresponding three-dimensional bounding box in the sample image.

Step 502, performing multiple iteration training on the neural network for detecting a target object based on the sample data.

It is possible to construct the neural network for detecting a target object, initialize its parameters, and then perform multiple iteration training, and update the parameters of the neural network for detecting the target object in each iteration training.

The iteration training includes step 5021, step 5022 and step 5023.

In step 5021, using the current neural network for detecting a target object to perform the following operations: detecting the target object in the sample image to obtain a detection result of a two-dimensional bounding box of the target object, and determining a relative position constraint relationship between the two-dimensional bounding box and the three-dimensional projection bounding box of the target object in the sample image.

The current neural network for detecting a target object may be used to extract a feature of the sample image, and the position of the two-dimensional bounding box of the target object may be detected based on the extracted image feature, and the relative position constraint relationship between the two-dimensional bounding box and the three-dimensional projection bounding box of the target object is determined.

The relative position constraint relationship between the two-dimensional bounding box and the three-dimensional projection bounding box of the target object may include a proportional relationship satisfied between the coordinates of several vertices of the two-dimensional bounding box and the coordinates of several vertices of the three-dimensional projection bounding box, or a distance relationship between the center point coordinates of the two-dimensional bounding box and the three-dimensional projection bounding box, or a relationship between the angles between several boundaries of the two-dimensional bounding box and several boundaries of the three-dimensional projection bounding box, etc.

In some alternative implementations, a parameter group may be preset, and the preset parameter group may include at least two first parameter pairs and at least four second parameters, where the first parameter pairs respectively represent a relative position of a vertex of the three-dimensional bounding box and the two-dimensional bounding box, and two parameters in the first parameter pair respectively represent: a relative position of a vertex on the three-dimensional bounding box and two vertices in a height direction of the two-dimensional bounding box, and a relative position of a vertex on the three-dimensional bounding box and two vertexes in a width direction of the two-dimensional bounding box; and each of the second parameters respectively represents a relative position of a vertex of the three-dimensional projection bounding box in a width or height direction of the two-dimensional bounding box, and two vertices of the two-dimensional bounding box in the same direction, and any one of the first parameter pairs and any one of the second parameters represent positions of different vertices of the three-dimensional projection bounding box relative to the two-dimensional bounding box.

Specifically, the preset parameter group may be a group of parameters $L_1$ represented by the formulas (1)-(5) in the above embodiment, or a group of parameters $L_1$ represented by the formulas (6)-(10) in the above embodiment. The parameter group $L_1$ corresponds to the posture type of the target object shown in FIGS. 3a and 3b, and the parameter group $L_2$ corresponds to the posture type of the target object shown in FIG. 3C.

In step 5021, the current neural network for detecting a target object may be used to predict values of parameters in the parameter group $L_1$ or $L_2$.

Further, the current neural network for detecting a target object may also be used to predict the posture type of the target object. Here, the posture type of the target object is related to the number of vertices blocked in the three-dimensional projection bounding box of the target object, for example, FIGS. 3a and 3c correspond to different posture types, respectively corresponding to the parameter group $L_1$ and the parameter group $L_2$. In this way, by distinguishing different posture types and correspondingly predicting the parameter values in different parameter groups, the neural network can more accurately learn the relative position relationship between the two-dimensional bounding box and the three-dimensional projection bounding box.

Alternatively, the posture type of the target object may also be related to an orientation of the target object. For example, FIGS. 3a and 3b correspond to different posture types. In this way, the neural network for detecting a target object may not be unable to accurately obtain the relative position relationship between the two-dimensional bounding box and the three-dimensional projection bounding box because of sudden change of some parameters in the parameter group during the iteration training, thereby avoiding ambiguity of training data to affect the reliability of the neural network.

In step 5022, determining a detection result of the three-dimensional projection bounding box of the target object in the sample image, based on the detection result of the two-dimensional bounding box of the target object in the sample image and the relative position constraint relationship between the two-dimensional bounding box and the three-dimensional projection bounding box of the target object in the sample image.

A method similar to that in the above step 202 may be used to calculate the coordinates of vertices of the three-dimensional projection bounding box of the target object in the sample image, based on vertex coordinates of the two-dimensional bounding box of the target object in the sample image, the predicted relative position relationship between the two-dimensional bounding box and the three-dimensional projection bounding box, thereby obtaining the detection result of the three-dimensional projection bounding box of the target object by the current neural network for detecting a target object.

Next, in step 5023, updating parameters of the neural network for detecting a target object, based on a difference between the detection result of the three-dimensional projection bounding box of the target object in the sample image and the labeled three-dimensional projection bounding box of the target object in the sample image.

A loss function may be constructed based on the difference between the detection result of the three-dimensional projection bounding box of the target object by the neural network for detecting a target object and the labeled three-dimensional projection bounding box of the target object in the sample image. Based on the loss function, through back propagation, a gradient descent method is used to update the parameters of the current neural network for detecting a target object. In a next iteration training, training may be performed based on the parameter-updated neural network for detecting a target object.

By performing multiple iteration training operations, the parameters of the neural network for detecting a target object are continuously optimized and updated. When the loss function reaches a preset convergence condition, for example, the value of the loss function is less than a preset value, or in the last few iterations, when the change rate is less than the preset value, iteration training may be stopped; alternatively, when the number of executions of the iteration training reaches a preset maximum number of iterations, the training may be stopped, and then a trained neural network for detecting a target object is obtained.

The method for training a neural network for detecting a target object of the above embodiment, acquiring the detection result of the two-dimensional bounding box of the target object in the sample image by the neural network, and the relative position constraint relationship between the two-dimensional bounding box and the three-dimensional projection bounding box of the target object in the sample image in the iteration training process of the neural network for detecting a target object, so that the neural network can learn more accurate position information, and solve the problem that the deep neural network is difficult to learn the relative position relationship between different bounding boxes, thereby improving the accuracy of the neural network for detecting a target object.

In some alternative implementations, the neural network for detecting a target object includes a two-dimensional regression branch and a three-dimensional regression branch, the two-dimensional regression branch outputs the detection result of the two-dimensional bounding box of the target object in the sample image, and the three-dimensional regression branch determines the relative position constraint relationship between the two-dimensional bounding box and the three-dimensional projection bounding box of the target object in the sample image.

Alternatively, the neural network for detecting a target object further includes a feature extraction branch. The feature extraction branch may be implemented as a convolutional layer, a pooling layer, a fully connected layer, or a combination of any two or more of the above. The two-dimensional regression branch and the three-dimensional regression branch may also be implemented as a network structure including at least one of a convolutional layer, a pooling layer, or a fully connected layer, and may further include an activation layer.

The feature extraction layer extracts a feature of the image and then enters the feature into the two-dimensional regression branch and the three-dimensional regression branch for further processing, respectively, and obtains the detection result of the two-dimensional bounding box of the target object in the sample image, and the relative position constraint relationship between the two-dimensional bounding box and the three-dimensional projection bounding box of the target object in the sample image.

In some alternative implementations of the present embodiment, the neural network for detecting a target object may further include a three-dimensional classification branch. The three-dimensional classification branch is used to determine the posture type of the target object in the sample image. It may also be implemented as a network structure including at least one of a convolutional layer, a pooling layer, or a fully connected layer, and may also include an activation layer. The posture type may be preset, and may be related to the number of vertices blocked by the target object among the vertices of the three-dimensional projection bounding box of the target object and/or the orientation of the target object. For example, the posture types may include the three types as shown in FIGS. 3a, 3b, and 3c.

In this regard, the iteration training may further include the following steps: determining the posture type of the target object using the three-dimensional classification branch. The three-dimensional classification branch may further determine the relative position constraint relationship between the two-dimensional bounding box and the three-dimensional projection bounding box of the target object in the sample image according to the posture type of the target object determined by the three-dimensional regression branch based on a classification result of the three-dimensional regression branch. After determining the posture type of the target object in the sample image, the three-dimensional regression branch may select the preset parameter group corresponding to the posture type of the target object to predict the parameter values. In this way, classifying the posture of the target object through the three-dimensional classification branch to determine the parameter group predicted by the three-dimensional regression branch, thereby reducing the number of parameters that the three-dimensional regression branch needs to predict, and further reducing redundant calculations.

In some alternative implementations of the present embodiment, the sample data further includes category labeling information of the target object in the sample image, and the neural network for detecting a target object further includes a two-dimensional classification branch; and the iteration training further includes: classifying the target object using the two-dimensional classification branch, and updating the parameters of the neural network for detecting a target object based on a difference between a classification result of the target object and the category labeling information of the target object.

The above loss function may further include an item that represents the difference between the classification result of the target object and the category labeling information of the target object, so that the classification of the target object and the detection of the two-dimensional and three-dimensional positions of the target object may be used as a joint training task to train the neural network for detecting a target object, so that the trained neural network for detecting a target object can not only detect the two-dimensional and three-dimensional positions of the target object, but also provide the category information of the target object.

Figure 6:
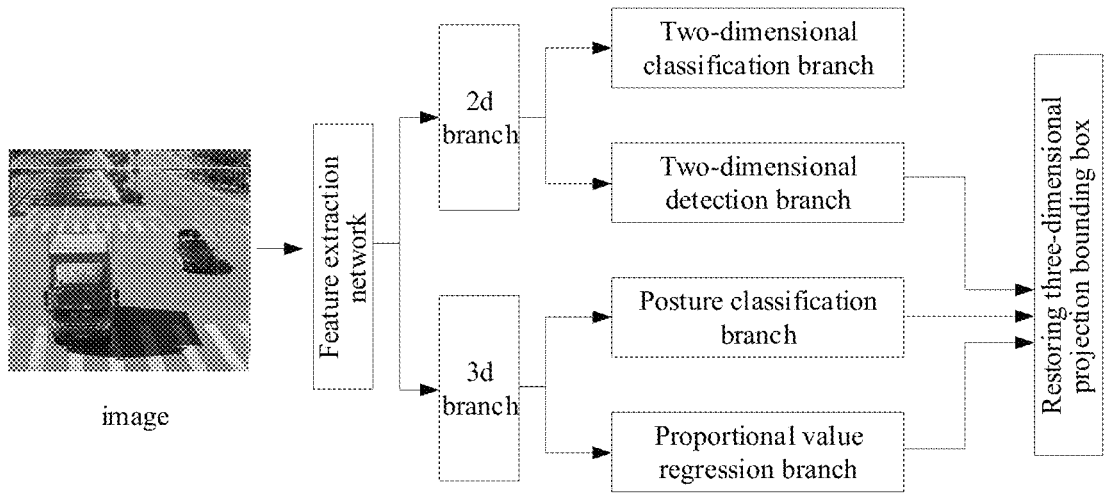
FIG. 6 is a schematic flowchart of one iteration training in the method for training a neural network for detecting a target object according to an embodiment of the present disclosure.

With reference to FIG. 6, illustrating a schematic flowchart of a method performed by the neural network for detecting a target object when detecting the target object according to the present disclosure.

As shown in FIG. 6, first, a feature extraction network extracts a feature of a sample image, and the extracted feature is respectively input into a 2d branch and a 3d branch for processing. The 2d branch includes a two-dimensional classification branch and a two-dimensional detection branch, where the two-dimensional classification branch is used to classify a target object in the image, and the two-dimensional detection branch is used to detect the position of the target object in the image, and output a two-dimensional bounding box. The 3d branch includes a posture classification branch and a proportional value regression branch. The posture classification branch is used to classify the posture of the target object in the image, and the proportional value regression branch is used to predict a preset parameter group corresponding to the target object in the image that represents a relative position constraint relationship between the two-dimensional bounding box and a three-dimensional projection bounding box. Then, based on the results of the two-dimensional detection branch, the posture classification branch and the proportional value regression branch, the three-dimensional projection bounding box may be restored.

Figure 7:
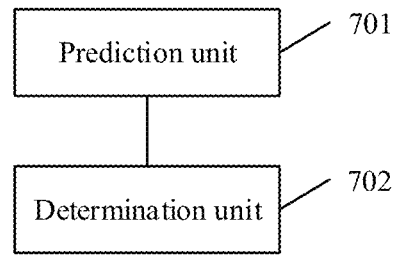
FIG. 7 is a schematic structural diagram of an apparatus for detecting a target object in an image according to an embodiment of the present disclosure.

With further reference to FIG. 7, as an implementation of the method for detecting a target object in an image shown in the above figures, an embodiment of the present disclosure provides an apparatus for detecting a target object in an image, and the apparatus embodiment corresponds to the method embodiment as shown in FIG. 2. The apparatus may be specifically applied to various electronic devices.

As shown in FIG. 7, an apparatus 700 for detecting a target object in an image of the present embodiment includes a prediction unit 701 and a determination unit 702. The prediction unit 701 is configured to perform the following prediction operations using a pre-trained neural network: detecting a target object in a two-dimensional image to determine a two-dimensional bounding box of the target object; and determining a relative position constraint relationship between the two-dimensional bounding box of the target object and a three-dimensional projection bounding box obtained by projecting a three-dimensional bounding box of the target object into the two-dimensional image. The determination unit 702 is configured to determine the three-dimensional projection bounding box of the target object, based on the two-dimensional bounding box of the target object and the relative position constraint relationship between the two-dimensional bounding box of the target object and the three-dimensional projection bounding box.

In some embodiments, the prediction unit 701 is configured to determine a relative position constraint relationship between the two-dimensional bounding box of the target object and a three-dimensional projection bounding box obtained by projecting a three-dimensional bounding box of the target object into the two-dimensional image as follows: determining values of parameters in a preset parameter group corresponding to the target object; where, the preset parameter group includes at least two first parameter pairs and at least four second parameters; each of the first parameter pairs respectively represents a relative position of a vertex of the three-dimensional bounding box and the two-dimensional bounding box, and two parameters in the first parameter pair respectively represent: a relative position of a vertex on the three-dimensional bounding box and two vertices in a height direction of the two-dimensional bounding box, and a relative position of a vertex on the three-dimensional bounding box and two vertexes in a width direction of the two-dimensional bounding box; and each of the second parameters respectively represents a relative position of a vertex of the three-dimensional projection bounding box in a width or height direction of the two-dimensional bounding box and two vertices of the two-dimensional bounding box in the same direction, and any one of the first parameter pairs and any one of the second parameters represent positions of different vertices of the three-dimensional projection bounding box relative to the two-dimensional bounding box.

In some embodiments, the prediction unit 701 is further configured to: determine a posture type of the target object from at least two preset posture types, where the posture type of the target object is related to the number of vertices blocked by the target object in vertices of the three-dimensional projection bounding box of the target object; and determine the preset parameter group corresponding to the target object according to the posture type of the target object.

In some embodiments, the posture type of the target object is also related to an orientation of the target object; and the determination unit 702 is configured to determine the three-dimensional projection bounding box of the target object, based on the two-dimensional bounding box of the target object and the relative position constraint relationship between the two-dimensional bounding box of the target object and the three-dimensional projection bounding box as follows: determining coordinates of part of vertices of the three-dimensional projection bounding box based on coordinates of the vertices of the two-dimensional bounding box, the values of the parameters in the preset parameter group, and the posture type of the target object; and calculating coordinates of other vertices of the three-dimensional projection bounding box, based on the determined coordinates of the part of vertices of the three-dimensional projection bounding box, and a projection geometric relationship between the three-dimensional projection bounding box and the corresponding three-dimensional bounding box.

In some embodiments, the prediction operations further include: classifying the target object to determine a category of the target object.

Figure 8:
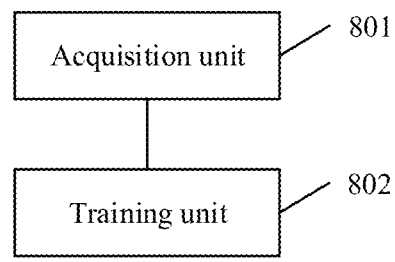
FIG. 8 is a schematic structural diagram of an apparatus for training a neural network for detecting a target object in an image according to an embodiment of the present disclosure.

With further reference to FIG. 8, as an implementation of the method for training a neural network for detecting a target object shown in the above figures, an embodiment of the present disclosure provides an apparatus for training a neural network for detecting a target object, and the apparatus embodiment corresponds to the method embodiment as shown in FIG. 5. The apparatus may be specifically applied to various electronic devices.

As shown in FIG. 8, an apparatus 800 for training a neural network for detecting a target object of the present embodiment includes an acquisition unit 801 and a training unit 802. The acquisition unit 801 is configured to acquire sample data, the sample data including a sample image of a three-dimensional projection bounding box labeling the included target object, the three-dimensional projection bounding box being a projection of a corresponding three-dimensional bounding box in the sample image. The training unit 802 is configured to perform multiple iteration training on the neural network for detecting a target object based on the sample data. The iteration training includes: using the current neural network for detecting a target object to perform the following operations: detecting the target object in the sample image to obtain a detection result of a two-dimensional bounding box of the target object, and determining a relative position constraint relationship between the two-dimensional bounding box and the three-dimensional projection bounding box of the target object in the sample image; determining a detection result of the three-dimensional projection bounding box of the target object in the sample image, based on the detection result of the two-dimensional bounding box of the target object in the sample image and the relative position constraint relationship between the two-dimensional bounding box and the three-dimensional projection bounding box of the target object in the sample image; and updating parameters of the neural network for detecting a target object, based on a difference between the detection result of the three-dimensional projection bounding box of the target object in the sample image and the labeled three-dimensional projection bounding box of the target object in the sample image.

In some embodiments, the neural network for detecting a target object includes a two-dimensional regression branch and a three-dimensional regression branch, the two-dimensional regression branch outputs the detection result of the two-dimensional bounding box of the target object in the sample image, and the three-dimensional regression branch determines the relative position constraint relationship between the two-dimensional bounding box and the three-dimensional projection bounding box of the target object in the sample image.

In some embodiments, the neural network for detecting a target object further includes a three-dimensional classification branch; and the iteration training further includes: determining a posture type of the target object using the three-dimensional classification branch, the posture type of the target object being related to the number of vertices blocked by the target object in vertices of the three-dimensional projection bounding box of the target object and/or an orientation of the target object; and determining the relative position constraint relationship between the two-dimensional bounding box and the three-dimensional projection bounding box of the target object in the sample image according to the posture type of the target object by the three-dimensional regression branch.

In some embodiments, the sample data further includes category labeling information of the target object in the sample image, and the neural network for detecting a target object further includes a two-dimensional classification branch; and the iteration training further includes: classifying the target object using the two-dimensional classification branch, and updating the parameters of the neural network for detecting a target object based on a difference between a classification result of the target object and the category labeling information of the target object.

The units in the above apparatus 700 and apparatus 800 correspond to the steps in the methods described with reference to FIGS. 2 and 5, respectively. Therefore, the operations, features, and technical effects that can be achieved for the method for detecting a target object in an image described above are also applicable to the apparatus 700, the apparatus 800, and the units included therein, detailed description thereof will be omitted.

Figure 9:
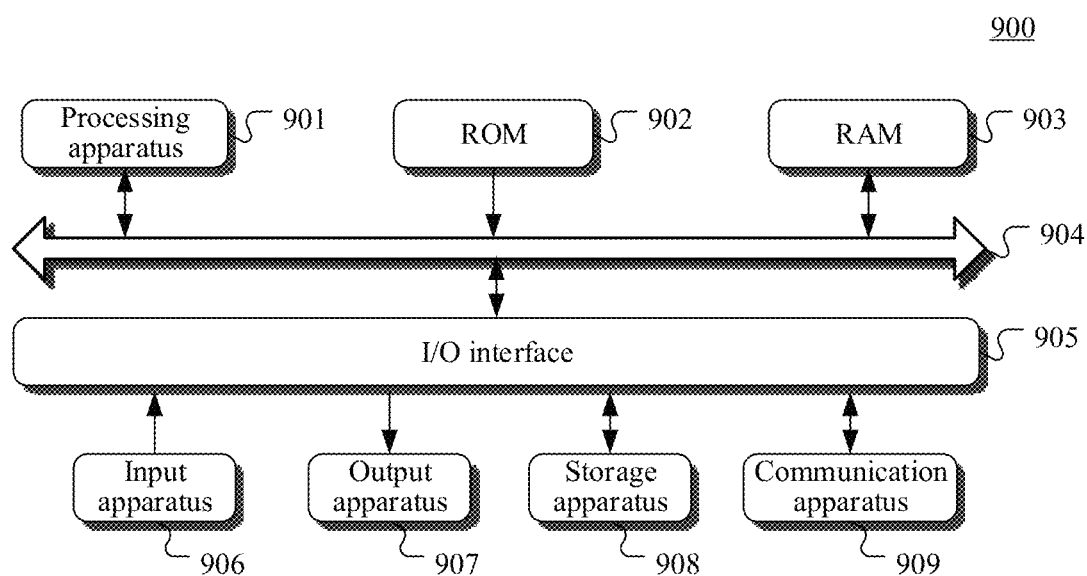
FIG. 9 is a schematic structural diagram of a computer system of an electronic device adapted to implement embodiments of the present disclosure.

Referring to FIG. 9, FIG. 9 is a schematic structural diagram of an electronic device 900 (e.g., the master server 105 in FIG. 1) adapted to implement embodiments of the present disclosure. The electronic device shown in FIG. 9 is merely an example, and should not bring any limitations to the functions and the scope of use of the embodiments of the present disclosure.

As shown in FIG. 9, the electronic device 900 may include a processing apparatus (e.g., a central processing unit and a graphics processing unit) 901, which may execute various appropriate actions and processes in accordance with a program stored in a read-only memory (ROM) 902 or a program loaded into a random access memory (RAM) 903 from a storage apparatus 908. The RAM 903 also stores various programs and data required by operations of the electronic device 900. The processing apparatus 901, the ROM 902 and the RAM 903 are connected to each other through a bus 904. An input/output (I/O) interface 905 is also connected to the bus 904.

Generally, the following apparatuses may be connected to the I/O interface 905: an input apparatus 906, including such as a touch screen, a touch pad, a keyboard, a mouse, a camera, a microphone, an accelerometer, or a gyroscope; an output apparatus 907 including such as a liquid crystal display (LCD), a speaker, or a vibrator; the storage apparatus 908 including such as a hard disk; and a communication apparatus 909. The communication apparatus 909 may allow the electronic device 900 to perform wireless or wired communication with other devices to exchange data. Although FIG. 9 shows the electronic device 900 having various apparatuses, it should be understood that it is not required to implement or have all the apparatuses shown. More or fewer apparatuses may be implemented or provided instead. Each block shown in FIG. 9 may represent one apparatus, and may also represent a plurality of apparatuses as required.

In particular, according to embodiments of the present disclosure, the process described above with reference to the flow chart may be implemented in a computer software program. For example, an embodiment of the present disclosure includes a computer program product, which includes a computer program that is tangibly embedded in a machine-readable medium. The computer program includes program codes for executing the method as illustrated in the flow chart. In such an embodiment, the computer program may be downloaded and installed from a network via the communication apparatus 909, or may be installed from the storage apparatus 908, or may be installed from the ROM 902. The computer program, when executed by the processing apparatus 901, implements the functions as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The computer readable medium may be included in the above electronic device, or a stand-alone computer readable medium not assembled into the electronic device. The computer readable medium carries one or more programs. The one or more programs, when executed by the electronic device, cause the electronic device to: performing following prediction operations using a pre-trained neural network: detecting a target object in a two-dimensional image to determine a two-dimensional bounding box of the target object, and determining a relative position constraint relationship between the two-dimensional bounding box of the target object and a three-dimensional projection bounding box obtained by projecting a three-dimensional bounding box of the target object into the two-dimensional image; and determining the three-dimensional projection bounding box of the target object, based on the two-dimensional bounding box of the target object and the relative position constraint relationship between the two-dimensional bounding box of the target object and the three-dimensional projection bounding box.

Alternatively, the one or more programs, when executed by the electronic device, cause the electronic device to: acquiring sample data, the sample data including a sample image of a three-dimensional projection bounding box labeling the included target object, the three-dimensional projection bounding box being a projection of a corresponding three-dimensional bounding box in the sample image; and performing multiple iteration training on the neural network for detecting a target object based on the sample data; the iteration training including: using the current neural network for detecting a target object to perform following operations: detecting the target object in the sample image to obtain a detection result of a two-dimensional bounding box of the target object, and determining a relative position constraint relationship between the two-dimensional bounding box and the three-dimensional projection bounding box of the target object in the sample image; determining a detection result of the three-dimensional projection bounding box of the target object in the sample image, based on the detection result of the two-dimensional bounding box of the target object in the sample image and the relative position constraint relationship between the two-dimensional bounding box and the three-dimensional projection bounding box of the target object in the sample image; and updating parameters of the neural network for detecting a target object, based on a difference between the detection result of the three-dimensional projection bounding box of the target object in the sample image and the labeled three-dimensional projection bounding box of the target object in the sample image.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, may be described as: a processor including a prediction unit and a determination unit, or a processor including an acquisition unit and a training unit. Here, the names of these units do not in some cases constitute limitations to such units themselves. For example the acquisition unit may also be described as "a unit configured to acquire sample data".

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for detecting a target object in an image, the method comprising:
    performing following prediction operations using a pre-trained neural network:
    detecting the target object in a two-dimensional image to determine a two-dimensional bounding box of the target object; and
    determining a relative position constraint relationship between the two-dimensional bounding box of the target object and a three-dimensional projection bounding box obtained by projecting a three-dimensional bounding box of the target object into the two-dimensional image; and
    the method further comprising:
    determining the three-dimensional projection bounding box of the target object, based on the two-dimensional bounding box of the target object and the relative position constraint relationship between the two-dimensional bounding box of the target object and the three-dimensional projection bounding box;
    wherein determining the relative position constraint relationship between the two-dimensional bounding box of the target object and the three-dimensional projection bounding box obtained by projecting the three-dimensional bounding box of the target object into the two-dimensional image, comprises:
    determining values of parameters in a preset parameter group corresponding to the target object;

wherein, the preset parameter group comprises at least two first parameter pairs and at least four second parameters;

wherein each of the first parameter pairs respectively represents a relative position of a vertex of the three-dimensional bounding box and the two-dimensional bounding box, and two parameters in the first parameter pair respectively represent: a relative position of a vertex on the three-dimensional bounding box and two vertices in a height direction of the two-dimensional bounding box, and a relative position of a vertex on the three-dimensional bounding box and two vertexes in a width direction of the two-dimensional bounding box; and wherein each of the second parameters respectively represents a relative position of a vertex of the three-dimensional projection bounding box in a width or height direction of the two-dimensional bounding box, and two vertices of the two-dimensional bounding box in a same direction, and any one of the first parameter pairs and any one of the second parameters represent positions of different vertices of the three-dimensional projection bounding box relative to the two-dimensional bounding box.

2. The method according to claim 1, wherein determining the relative position constraint relationship between the two-dimensional bounding box of the target object and the three-dimensional projection bounding box obtained by projecting the three-dimensional bounding box of the target object into the two-dimensional image, further comprises:

determining a posture type of the target object from at least two preset posture types, wherein the posture type of the target object is related to a number of vertices blocked by the target object among vertices of the three-dimensional projection bounding box of the target object; and determining the preset parameter group corresponding to the target object according to the posture type of the target object.

3. The method according to claim 2, wherein the posture type of the target object is further related to an orientation of the target object, and wherein determining the three-dimensional projection bounding box of the target object, based on the two-dimensional bounding box of the target object and the relative position constraint relationship between the two-dimensional bounding box of the target object and the three-dimensional projection bounding box, comprises:

determining coordinates of part of vertices of the three-dimensional projection bounding box based on coordinates of the vertices of the two-dimensional bounding box, the values of the parameters in the preset parameter group, and the posture type of the target object; and calculating coordinates of other vertices of the three-dimensional projection bounding box, based on the determined coordinates of the part of vertices of the three-dimensional projection bounding box, and a projection geometric relationship between the three-dimensional projection bounding box and the corresponding three-dimensional bounding box.

4. The method according to claim 1, wherein the prediction operations further comprise:

classifying the target object to determine a category of the target object.

5. The method according to claim 1, wherein the pre-trained neural network is trained by:

acquiring sample data, the sample data comprising a sample image of a three-dimensional projection bounding box labeling the target object included in the three-dimensional projection bounding box, the three-dimensional projection bounding box being a projection of a corresponding three-dimensional bounding box in the sample image; and performing multiple iteration training on the neural network for detecting the target object based on the sample data;

the iteration training comprising:

using the current neural network for detecting the target object to perform following operations:

detecting the target object in the sample image to obtain a detection result of a two-dimensional bounding box of the target object; and determining a relative position constraint relationship between the two-dimensional bounding box and the three-dimensional projection bounding box of the target object in the sample image;

determining a detection result of the three-dimensional projection bounding box of the target object in the sample image, based on the detection result of the two-dimensional bounding box of the target object in the sample image and the relative position constraint relationship between the two-dimensional bounding box and the three-dimensional projection bounding box of the target object in the sample image; and updating parameters of the neural network for detecting the target object, based on a difference between the detection result of the three-dimensional projection bounding box of the target object in the sample image and the three-dimensional projection bounding box of the target object in the sample image.

6. The method according to claim 5, wherein the neural network for detecting the target object comprises a two-dimensional regression branch and a three-dimensional regression branch, wherein the two-dimensional regression branch outputs the detection result of the two-dimensional bounding box of the target object in the sample image, and the three-dimensional regression branch determines the relative position constraint relationship between the two-dimensional bounding box and the three-dimensional projection bounding box of the target object in the sample image.

7. The method according to claim 6, wherein the neural network for detecting the target object further comprises a three-dimensional classification branch, and wherein the iteration training further comprises:

determining a posture type of the target object using the three-dimensional classification branch, the posture type of the target object being related to a number of vertices blocked by the target object in vertices of the three-dimensional projection bounding box of the target object, and/or an orientation of the target object; and determining the relative position constraint relationship between the two-dimensional bounding box and the three-dimensional projection bounding box of the target object in the sample image according to the posture type of the target object by the three-dimensional regression branch.

8. The method according to claim 6, wherein the sample data further comprises category labeling information of the target object in the sample image, and the neural network for detecting the target object further comprises a two-dimensional classification branch, and wherein the iteration training further comprises:

classifying the target object using the two-dimensional classification branch; and updating the parameters of the neural network for detecting the target object based on a difference between a classification result of the target object and the category labeling information of the target object.

9. An apparatus for detecting a target object in an image, the apparatus comprising:
at least one processor; and
a memory storing instructions, wherein the instructions when executed by the at least one processor, cause the at least one processor to perform operations, the operations comprising:
performing following prediction operations using a pre-trained neural network:
detecting the target object in a two-dimensional image to determine a two-dimensional bounding box of the target object;
determining a relative position constraint relationship between the two-dimensional bounding box of the target object and a three-dimensional projection bounding box obtained by projecting a three-dimensional bounding box of the target object into the two-dimensional image; and
determining the three-dimensional projection bounding box of the target object, based on the two-dimensional bounding box of the target object and the relative position constraint relationship between the two-dimensional bounding box of the target object and the three-dimensional projection bounding box,
wherein determining the relative position constraint relationship between the two-dimensional bounding box of the target object and the three-dimensional projection bounding box obtained by projecting the three-dimensional bounding box of the target object into the two-dimensional image comprises:
determining values of parameters in a preset parameter group corresponding to the target object,
wherein the preset parameter group comprises at least two first parameter pairs and at least four second parameters,
wherein each of the first parameter pairs respectively represents a relative position of a vertex of the three-dimensional bounding box and the two-dimensional bounding box, and two parameters in the first parameter pair respectively represent: a relative position of a vertex on the three-dimensional bounding box and two vertices in a height direction of the two-dimensional bounding box, and a relative position of a vertex on the three-dimensional bounding box and two vertexes in a width direction of the two-dimensional bounding box, and
wherein each of the second parameters respectively represents a relative position of a vertex of the three-dimensional projection bounding box in a width or height direction of the two-dimensional bounding box, and two vertices of the two-dimensional bounding box in a same direction, and any one of the first parameter pairs and any one of the second parameters represent positions of different vertices of the three-dimensional projection bounding box relative to the two-dimensional bounding box.

10. The apparatus according to claim 9, wherein determining the relative position constraint relationship between the two-dimensional bounding box of the target object and the three-dimensional projection bounding box obtained by projecting the three-dimensional bounding box of the target object into the two-dimensional image, further comprises:
determining a posture type of the target object from at least two preset posture types, wherein the posture type of the target object is related to a number of vertices blocked by the target object among vertices of the three-dimensional projection bounding box of the target object; and
determining the preset parameter group corresponding to the target object according to the posture type of the target object.

11. The apparatus according to claim 10, wherein the posture type of the target object is further related to an orientation of the target object, and wherein determining the three-dimensional projection bounding box of the target object, based on the two-dimensional bounding box of the target object and the relative position constraint relationship between the two-dimensional bounding box of the target object and the three-dimensional projection bounding box, comprises:
determining coordinates of part of vertices of the three-dimensional projection bounding box based on coordinates of the vertices of the two-dimensional bounding box, the values of the parameters in the preset parameter group, and the posture type of the target object; and
calculating coordinates of other vertices of the three-dimensional projection bounding box, based on the determined coordinates of the part of vertices of the three-dimensional projection bounding box, and a projection geometric relationship between the three-dimensional projection bounding box and the corresponding three-dimensional bounding box.

12. The apparatus according to claim 9, wherein the prediction operations further comprise:
classifying the target object to determine a category of the target object.

13. The apparatus according to claim 9, wherein the pre-trained neural network is trained by:
acquiring sample data, the sample data comprising a sample image of a three-dimensional projection bounding box labeling the target object included in the three-dimensional projection bounding box, the three-dimensional projection bounding box being a projection of a corresponding three-dimensional bounding box in the sample image; and
performing multiple iteration training on the neural network for detecting the target object based on the sample data;
the iteration training comprising:
using the current neural network for detecting the target object to perform following operations: detecting the target object in the sample image to obtain a detection result of a two-dimensional bounding box of the target object, and determining a relative position constraint relationship between the two-dimensional bounding box and the three-dimensional projection bounding box of the target object in the sample image;
determining a detection result of the three-dimensional projection bounding box of the target object in the sample image, based on the detection result of the two-dimensional bounding box of the target object in the sample image and the relative position constraint relationship between the two-dimensional bounding box and the three-dimensional projection bounding box of the target object in the sample image; and
updating parameters of the neural network for detecting the target object, based on a difference between the detection result of the three-dimensional projection bounding box of the target object in the sample image and the three-dimensional projection bounding box of the target object in the sample image.

14. The apparatus according to claim 13, wherein the neural network for detecting the target object comprises a two-dimensional regression branch and a three-dimensional regression branch, wherein the two-dimensional regression branch outputs the detection result of the two-dimensional bounding box of the target object in the sample image, and the three-dimensional regression branch determines the relative position constraint relationship between the two-dimensional bounding box and the three-dimensional projection bounding box of the target object in the sample image.

15. The apparatus according to claim 14, wherein the neural network for detecting the target object further comprises a three-dimensional classification branch, and wherein the iteration training further comprises:
  determining a posture type of the target object using the three-dimensional classification branch, the posture type of the target object being related to a number of vertices blocked by the target object in vertices of the three-dimensional projection bounding box of the target object, and/or an orientation of the target object; and
  determining the relative position constraint relationship between the two-dimensional bounding box and the three-dimensional projection bounding box of the target object in the sample image according to the posture type of the target object by the three-dimensional regression branch.

16. The apparatus according to claim 14, wherein the sample data further comprises category labeling information of the target object in the sample image, and the neural network for detecting the target object further comprises a two-dimensional classification branch, and wherein the iteration training further comprises:
  classifying the target object using the two-dimensional classification branch, and updating the parameters of the neural network for detecting the target object based on a difference between a classification result of the target object and the category labeling information of the target object.

17. A non-transitory computer readable medium, storing a computer program thereon, the program, when executed by a processor, implements the method according to claim 1.

* * * * *